United States Patent
Öberg

(10) Patent No.: US 8,218,258 B1
(45) Date of Patent: *Jul. 10, 2012

(54) DC-CONTROL FOR POST PROCESSOR

(75) Inventor: Mats Öberg, Cupertino, CA (US)

(73) Assignee: Marvell International Ltd., Hamilton (BM)

(*) Notice: Subject to any disclaimer, the term of this patent is extended or adjusted under 35 U.S.C. 154(b) by 458 days.

This patent is subject to a terminal disclaimer.

(21) Appl. No.: 12/360,065

(22) Filed: Jan. 26, 2009

Related U.S. Application Data

(62) Division of application No. 10/899,630, filed on Jul. 26, 2004, now Pat. No. 7,489,750.

(60) Provisional application No. 60/536,789, filed on Jan. 15, 2004.

(51) Int. Cl.
*G11B 5/035* (2006.01)

(52) U.S. Cl. .......................................................... 360/65

(58) Field of Classification Search .................. 360/39, 360/25, 32, 46, 65, 68; 375/350, 342, 316
See application file for complete search history.

(56) References Cited

U.S. PATENT DOCUMENTS

| | | | |
|---|---|---|---|
| 5,635,934 A * | 6/1997 | Brown | 341/118 |
| 5,757,928 A * | 5/1998 | Schaar | 381/22 |
| 6,005,726 A * | 12/1999 | Tsunoda | 360/46 |
| 6,101,054 A * | 8/2000 | Tsunoda | 360/46 |
| 6,304,396 B1 | 10/2001 | Ramalho et al. | |
| 6,332,205 B1 | 12/2001 | Conway | |
| 6,381,082 B1 | 4/2002 | Voorman et al. | |
| 6,525,891 B1 * | 2/2003 | Tsunoda | 360/25 |
| 6,687,067 B2 | 2/2004 | Brianti et al. | |
| 6,747,936 B1 | 6/2004 | Shim | |
| 7,116,504 B1 | 10/2006 | Oberg et al. | |
| 7,286,311 B1 | 10/2007 | Oberg et al. | |
| 7,330,320 B1 | 2/2008 | Oberg et al. | |
| 7,489,750 B1 * | 2/2009 | Oberg | 375/350 |
| 2009/0207517 A1 * | 8/2009 | Bliss | 360/32 |
| 2009/0274028 A1 * | 11/2009 | Galbraith et al. | 369/59.2 |
| 2009/0274247 A1 * | 11/2009 | Galbraith et al. | 375/341 |

* cited by examiner

*Primary Examiner* — Fred Tzeng

(57) ABSTRACT

Systems and techniques relating to interpreting signals on a noisy channel. A direct current (DC) correction can be applied to an input of a post processor outside of a main read path that supplies data detector output to the post processor. A signal processor, such as a read channel transceiver device usable in a magnetic recording system, has a main read path including a signal equalizer and a data detector. A post processor is responsive to the output of the data detector, and a DC control unit applies a DC correction to an input of the post processor outside of the main read path.

21 Claims, 3 Drawing Sheets

DC-CONTROL FOR POST PROCESSOR

CROSS REFERENCE TO RELATED APPLICATIONS

This application is a divisional application of and claims the benefit of priority to U.S. application Ser. No. 10/899,630, filed Jul. 26, 2004, which claims the benefit of the priority of U.S. Provisional Application Ser. No. 60/536,789, filed Jan. 15, 2004 and entitled "DC-Control for Post Processor".

TECHNICAL FIELD

The present disclosure describes systems and techniques relating to signal processing, for example, interpreting read signals obtained from a magnetic storage medium.

BACKGROUND

Signal processing circuits are frequently used to read storage media and interpret obtained analog signals as discrete values stored on the media. For magnetic storage media, a transducer head may fly on a cushion of air over a magnetic disk surface. The transducer converts magnetic field variations into an analog electrical signal. The analog signal is amplified, converted to a digital signal and interpreted (e.g., using maximum likelihood techniques, such as using a Viterbi detector). Tracking of stored data during a read operation is frequently performed using feedback or decision aided gain and timing control. Additionally, perpendicular magnetic recording techniques can be used to increase the amount of data stored on a magnetic medium.

As the amount of data stored on a magnetic medium is increased, a higher error-rate can result unless error detection and correction techniques are used to compensate. Post-processing is often used to improve the error-rate performance of the main detector in magnetic recording systems. For example, a post processor, such as a media noise processor (MNP), can process detector output in a read channel to improve performance. Additionally, direct current (DC) correction circuitry is sometimes used to reduce DC distortion before the main detector.

SUMMARY

The present disclosure includes systems and techniques relating to interpreting signals on a noisy channel. According to an aspect of the described systems and techniques, a direct current (DC) correction is applied to an input of a post processor outside of a main read path that supplies data detector output to the post processor. A signal processor, such as a read channel transceiver device usable in a magnetic recording system, has a main read path including a signal equalizer and a data detector. A post processor is responsive to the output of the data detector, and a DC control unit applies a DC correction to an input of the post processor outside of the main read path.

The described systems and techniques can result in improved performance for a post processor in a magnetic recording channel. DC control circuitry used for the main data path can be used to reduce DC offset of the post processor input. In some instances, the DC correction value is scaled to compensate for different gains of where the correction is added to the main data path and where the post processor input is taken from the main data path. Additionally, a separate DC correction circuit can be provided for the post processor input, or a combined circuit with separate DC correction outputs for the main data path and the post processor input, respectively, can be provided.

Details of one or more implementations are set forth in the accompanying drawings and the description below. Other features, objects and advantages may be apparent from the description and drawings, and from the claims.

DRAWING DESCRIPTIONS

Like reference symbols in the various drawings indicate like elements.

DETAILED DESCRIPTION

Figure 1:
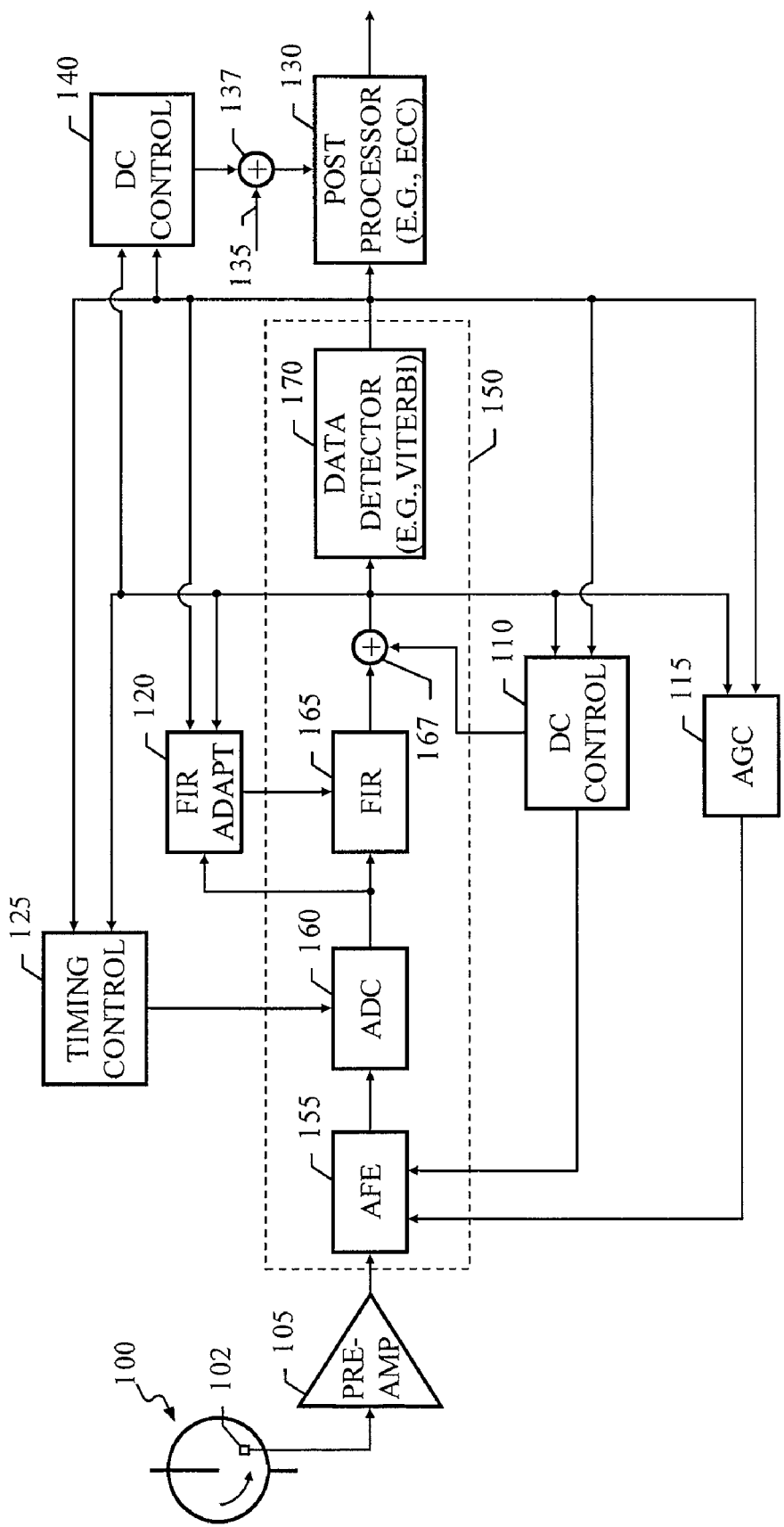
FIG. 1 is a block diagram showing a read channel in a storage system that applies a DC correction to an input of a post processor outside of a main read path.

FIG. 1 is a block diagram showing a read channel in a storage system that applies a DC correction to an input of a post processor outside of a main read path. The storage system includes a storage medium 100 and read head 102. The storage medium can be read-only or read/write media and can be magnetic-based, optical-based, semiconductor-based media, or a combination of these. Examples of the storage medium include hard disk platters in a hard disk drive, a floppy disk, a tape, and an optical disk (e.g., laser disk, compact disk, digital versatile disk). The storage medium is depicted in FIG. 1 as a disk for illustration only; the systems and techniques described herein can be used with other storage media types or in non-storage applications (e.g., communications equipment).

The read head 102 can be part of a read-write head assembly that reads the storage media 100 under the control of an actuator (e.g., a servo). An analog read signal is generated and can be sent to a pre-amplifier 105. The system can include an analog front end (AFE) 155, which can provide filtering and gain control. The AFE 155 can have inputs from both a DC control unit 110 and an automatic gain control (AGC) unit 115, and the AFE 155 can include a variable-gain amplifier (VGA), which can be regulated by the AGC 115.

An analog to digital converter (ADC) 160 converts the read signal, and a signal equalizer 165 shapes the signal to a desired target. The ADC 160 can be a 6-bit ADC. The signal equalizer 165 can be a finite impulse response (FIR) digital filter, such as a 9-tap FIR, which can be programmable or adaptive. For example, the system can include an FIR adaptation unit 120 that provides a control input to an FIR 165.

A data detector 170 interprets its input as discrete values stored on the media 100. Timing control circuitry, including a timing control unit 125 and/or a phase locked loop (PLL), can be used to regulate the filtered signal provided to the detector 170, and the DC control unit 110 can apply a DC correction in the main read path 150 using an adder 167. The data detector 170 can be a Viterbi detector. The main read path 150 can combine partial-response equalization with maximum-likelihood sequence detection (PRML), using either a discrete-time approach and/or a continuous-time approach (e.g., the class-IV partial response target (PR-IV)).

The output of the data detector 170 is provided to a post processor 130, which can be error correction circuitry (ECC) used to identify and correct errors in a detected sequence. In addition to the input from the data detector 170 in the main read path 150, the post processor 130 includes an input 135, which can come from various places within the main read path 150. A DC control unit 140 applies a DC correction to the input 135 using an adder 137 to combine the DC correction with the input 135. This is done outside of the main read path 150.

Application of a DC correction to an input of the post processor 130 outside of the main read path 150 can result in improved system performance, including reducing or eliminating DC distortion in the read channel. Such DC distortion can have various sources, including data dependent DC wander, and can severely degrade system performance if not corrected. DC distortion can remain in the system even when DC correction is applied in the AFE 155 and to the input of the data detector 170 as illustrated.

Figure 2:
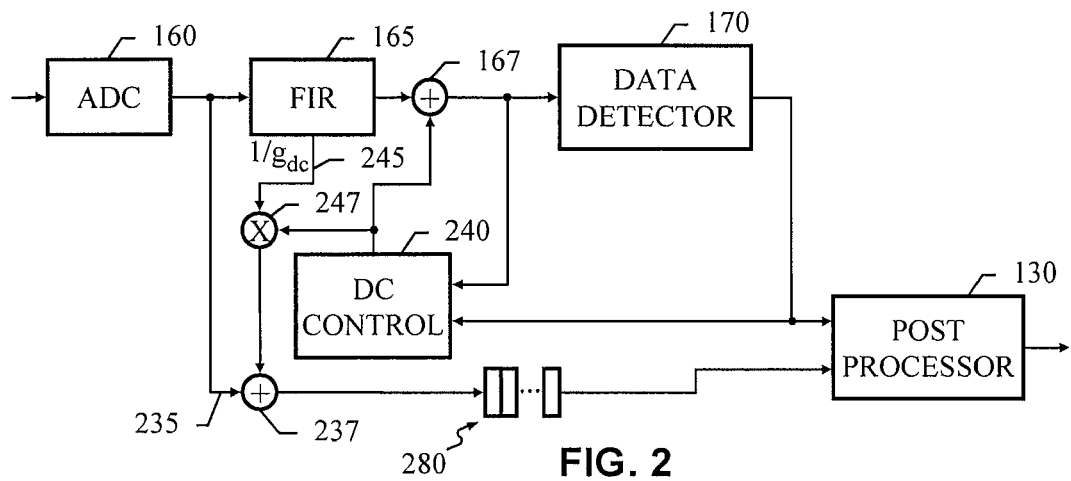
FIGS. 2-4 are block diagrams showing implementations of a portion of a signal processor that applies a DC correction to an input of a post processor outside of a main read path.
Figure 3:
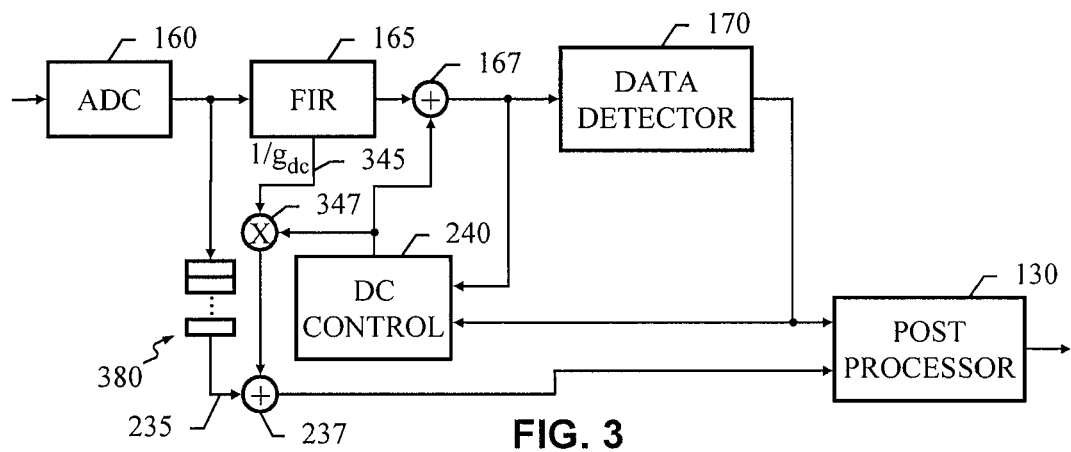
Figure 4:
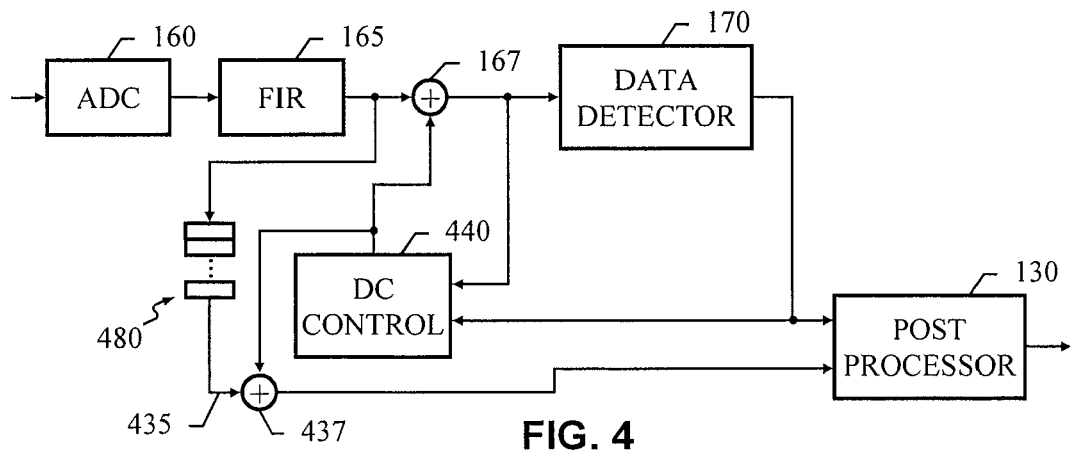

The DC control unit 140 can be a separate unit as shown, or the DC control units 110, 140 can be the same unit, as illustrated in FIGS. 2-4. The DC control unit 140 can be integrated into the post processor 130. Moreover, the post processor 130 can have one or more additional inputs taken from various locations in the main read path 150, such as an input taken from the output of the ADC 160, an input taken from the output of the signal equalizer 165 (i.e., before a DC correction is applied at the DC correction adder 167), or an input taken from the input of the data detector 170 (i.e., after the DC correction is applied at the DC correction adder 167). Such additional inputs can also have appropriate delays inserted to compensate for the decision latency in the detector 170, and the signal delay through the signal equalizer 165 and DC correction adder 167.

FIG. 2 illustrates an implementation of a portion of a signal processor that applies a DC correction to an input of a post processor outside of a main read path. In this implementation, a DC correction is added to the ADC 160 output 235 that is fed to the post processor 130. The ADC output 235 is the signal input of the signal equalizer 165.

A DC control unit 240 generates a DC control signal that is provided both to the DC correction adder 167 and to a multiplier 247 that mixes the DC control signal with a DC gain signal 245 corresponding to the signal equalizer 165 to generate the DC correction applied to the input 235 of the post processor 130 using a second DC correction adder 237.

The signal equalizer 165 can be an FIR digital filter, and the DC gain signal 245 can be a scaling factor of $1/g_{dc}$, where $g_{dc}$ denotes the DC gain of the FIR equalizer. The signal 245 is shown as coming from the signal equalizer 165, but the signal 245 can come from another location in the signal processor. In general, the signal 245 compensates for the DC gain of the signal equalizer 165. In addition, one or more control signals from the DC control unit 240 can also be provided to the ADC 160, depending on the implementation.

One or more buffers 280 delay the DC corrected input 235 to the post processor 130. DC correction often lags behind in time the actual DC offset. Delaying the input 235 to the post processor 130 compensates for this time lag, and this signal delay can be taken advantage of by placing at least a portion of the buffer(s) 280 along the input 235 before the correction adder 237, delaying the signal-equalizer input being provided to the correction adder 237 that falls outside the main read path.

FIG. 3 illustrates such a signal processor implementation. In this implementation, the DC control lags behind the DC offset, and this is compensated by using one or more buffers 380 along the input 235 before the correction adder 237. The buffer(s) 380 delay the input 235 by a number of clock cycles before adding the DC correction. The DC correction value in this implementation may be more accurate for the delayed samples due to delays in the DC control loop. The amount of delay can be the same as the total delay applied to the signal 235 prior to using it in the post processor 130. Alternatively, the delay can be smaller than this, and the residual delay needed can be applied after the addition of the DC correction value.

FIG. 4 illustrates an implementation in which a signal output of the signal equalizer 165 is used as an input 435 to the post processor 130. The input 435 can be delayed using one or more buffers 480. A DC control unit 440 applies a DC correction both to the signal-equalizer output in the main read path using the inside adder 167 and to the delayed signal-equalizer output 435 outside of the main read path using an outside adder 437. As before, the amount of delay prior to DC correction can vary according to implementation, and the total delay matches the delay requirements due to detector latency. Additionally, a weighting factor can be applied to the DC control signal to generate the DC correction applied outside of the main read path.

In the implementations illustrated in FIGS. 2-4, a single DC control loop with a single DC control signal is used for the DC correction in the main data path and for the DC correction outside of the main data path. This can reduce complexity and lower costs of circuit implementation. However, as mentioned above, a separate DC control unit can be provided for the post processor. Moreover, a combined DC control unit can be provided with a first output to correct data detector input and a second output to correct the post-processor input, where the two outputs are optimized for their respective purposes.

Figure 5:
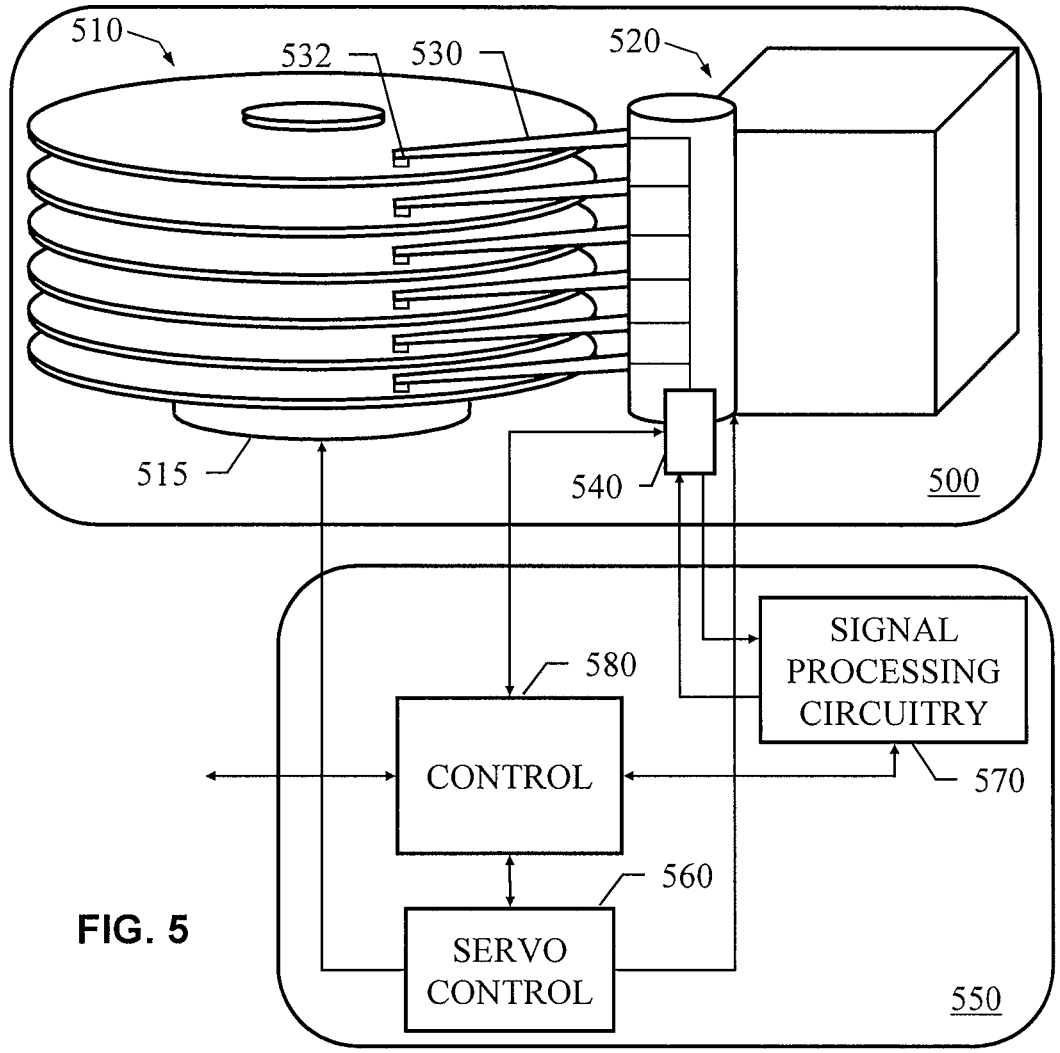
FIG. 5 is a block diagram showing a magnetic-media disk drive that employs DC correction as described.

The signal processor components described can be implemented as one or more devices, such as one or more integrated circuit (IC) devices, in a storage device. FIG. 5 is a block diagram showing a magnetic-media disk drive that employs DC correction as described. The disk drive includes a head-disk assembly (HDA) 500 and drive electronics 550 (e.g., a printed circuit board (PCB) with semiconductor devices). The HDA 500 includes one or more disks 510 mounted on an integrated spindle and motor assembly 515. The spindle and motor assembly 515 rotates the disk(s) 510 under read-write head(s) connected with a head assembly 520 in the HDA 500. The disk(s) 510 can be coated with a magnetically hard material (e.g., a particulate surface or a thin-film surface) and can be written to, or read from, a single side or both sides of each disk.

A head 532 on an arm 530 can be positioned as needed to read data on the disk. A motor (e.g., a voice coil motor or a stepper motor) can be used to position the head over a desired track. The arm 530 can be a pivoting or sliding arm and can be spring-loaded to maintain a proper flying height for the head 532 in any drive orientation. A closed-loop head positioning system can be used.

The HDA 500 can include a read-write chip 540, where head selection and sense current value(s) can be set. The read-write chip 540 can amplify a read signal before outputting it to signal processing circuitry 570. The signal processing circuitry 570 can include a read signal circuit, a servo signal processing circuit, and a write signal circuit.

Signals between the HDA 500 and the drive electronics 550 can be carried through a flexible printed cable. A controller 580 can direct a servo controller 560 to control mechanical operations, such as head positioning through the head assembly 520 and rotational speed control through the motor assembly 515. The controller 580 can be one or more IC chips (e.g., a combo chip). The controller 580 can be a microprocessor and a hard disk controller. The drive electronics 550 can also include various interfaces, such as a host-bus interface, and memory devices, such as a read only memory (ROM) for use by a microprocessor, and a random access memory (RAM) for use by a hard disk controller. The hard disk controller can include error correction circuitry.

The HDA 500 and drive electronics 550 can be closed in a sealed container with an integral air filter. For example, the hard disk drive can be assembled using a Winchester assembly. The rotating platter can be driven by a brush-less DC motor, and the rotational frequency can be accurately servo-locked to a crystal reference.

Figure 6:
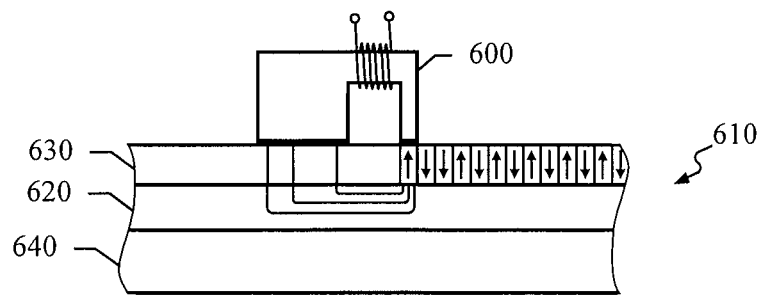
FIG. 6 is a block diagram showing perpendicular magnetic recording as can be used in the magnetic-media disk drive of FIG. 5.

FIG. 6 is a block diagram showing perpendicular magnetic recording (PMR) as can be used in the magnetic-media disk drive of FIG. 5. A read-write head 600 flies over a PMR storage disk 610. The head 600 records bits perpendicular to the plane of the disk. The PMR disk 610 includes a high permeability ("soft") magnetic under-layer 620 between a perpendicularly magnetized thin film data storage layer 630 and the substrate 640. An image of the magnetic head pole created by the head 600 is produced in the magnetically soft under-layer 620. Consequently, the storage layer 630 is effectively in the gap of the recording head, where the magnetic recording field is larger than the fringing field produced by a longitudinal magnetic recording (LMR) head.

In PMR, the channel response has a DC component. For a channel that is AC-coupled to the preamplifier and read channel, or that contains some other means for high-pass filtering the channel response, there may be DC-distortion. The DC-distortion may manifest itself as a data dependent baseline wander, which can severely affect the performance of a system that equalizes the channel response to a response target that is not DC-free. Thus, the DC correction techniques described can be especially useful in the context of PMR systems. For additional information, see U.S. patent application Ser. No. 10/737,648, filed Dec. 15, 2003 and entitled "DC-Offset Compensation Loops for Magnetic Recording System", and U.S. patent application Ser. No. 10/752,817, filed Jan. 6, 2004 and entitled "Method and Apparatus to Limit DC-Level in Coded Data".

A few embodiments have been described in detail above, and various modifications are possible. Thus, other embodiments may be within the scope of the following claims.

What is claimed is:

1. A system comprising:
   a magnetic recording medium;
   a head assembly operable to obtain an analog signal from the magnetic recording medium;
   a main read path responsive to the obtained analog signal and including an analog to digital converter, a signal equalizer and a data detector;
   a post processor responsive to an output of the data detector; and
   a direct current (DC) control unit that applies a DC correction to an input of the post processor, outside of the main read path.

2. The system of claim 1, wherein the magnetic recording medium comprises a perpendicular magnetic recording medium.

3. The system of claim 1, further comprising an adder, outside of the main read path, that combines the DC correction with a signal input of the signal equalizer to generate the input of the post processor.

4. The system of claim 3, further comprising an adder, in the main read path, that combines an output signal of the signal equalizer with a DC control signal of the DC control unit, and a multiplier that mixes the DC control signal with a DC gain signal corresponding to the signal equalizer to generate the DC correction.

5. The system of claim 4, wherein the signal equalizer comprises a finite impulse response (FIR) filter, and the DC gain signal comprises a scaling factor of $1/g_{dc}$, where $g_{dc}$ comprises a DC gain of the FIR filter.

6. The system of claim 4, further comprising one or more buffers along the input of the post processor outside of the main read path.

7. The system of claim 6, wherein at least a portion of the one or more buffers is placed along the input of the post processor before the outside adder and delays the signal-equalizer input provided to the outside adder.

8. The system of claim 1, further comprising an adder, outside of the main read path, that combines the DC correction with a signal output of the signal equalizer to generate the input of the post processor.

9. The system of claim 8, further comprising one or more buffers along the input of the post processor outside of the main read path, wherein at least a portion of the one or more buffers is placed along the input of the post processor before the outside adder and delays the signal-equalizer output provided to the outside adder.

10. The system of claim 9, further comprising an adder, in the main read path, that combines the signal-equalizer output with the DC correction to generate an input of the data detector.

11. The system of claim 1, wherein the DC control unit also applies a DC correction in the main read path.

12. The system of claim 1, wherein the DC control unit comprises a second DC control unit separate from a first DC control unit that applies a DC correction in the main read path.

13. The system of claim 1, wherein the signal equalizer comprises a finite impulse response (FIR) digital filter, the data detector comprises a Viterbi detector, and the post processor comprises error correction circuitry.

14. A method comprising:
    obtaining an analog signal from a magnetic recording medium;
    processing the analog signal in a main read path to detect data in the analog signal, the processing including converting the analog signal to a digital signal, equalizing the digital signal and detecting the data in the equalized signal;
    post-processing an output of the detecting; and
    applying a direct current (DC) correction to an input of the post-processing outside of the main read path.

15. The method of claim 14, further comprising combining, outside of the main read path, the DC correction with a signal input of the equalizing to generate the input of the post-processing.

16. The method of claim 15, further comprising combining, in the main read path, an output signal of the equalizing with a DC control signal of a DC control unit, and mixing the DC control signal with a DC gain signal corresponding to the equalizing to generate the DC correction.

17. The method of claim 16, further comprising delaying the input of the post-processing outside of the main read path.

18. The method of claim 17, wherein delaying the input comprises performing at least a portion of a total delay before the combining of the DC correction with the signal input of the equalizing.

19. The method of claim 14, wherein applying the DC correction comprises combining, outside of the main read path, the DC correction with a signal output of the equalizing to generate the input of the post-processing.

20. The method of claim 19, further comprising delaying the input of the post-processing outside of the main read path, the delaying comprising performing at least a portion of a total delay before the combining of the DC correction with the signal output of the equalizing.

21. The method of claim 20, further comprising combining, in the main read path, the signal output of the equalizing with the DC correction to generate an input of the detecting.

* * * * *